United States Patent

Schorr et al.

[11] 3,865,820
[45] Feb. 11, 1975

[54] ACYLAMINO-CEPHALOSPORANIC ACIDS

[75] Inventors: Manfred Schorr, Frankfurt am Main; Elmar Schrinner, Wiesbaden, both of Germany

[73] Assignee: Farbwerke Hoechst Aktiengesellschaft vormals Meister Lucius & Bruning, Frankfurt/Main, Germany

[22] Filed: Apr. 14, 1972

[21] Appl. No.: 244,287

[30] Foreign Application Priority Data
Apr. 17, 1971  Germany............................. 2118635

[52] U.S. Cl............................. 260/243 C, 424/246
[51] Int. Cl.............................................. C07d 99/24
[58] Field of Search ........................... 260/243 C

[56] References Cited
UNITED STATES PATENTS

| | | | |
|---|---|---|---|
| 3,457,257 | 7/1969 | Hanessian et al. | 260/243 C |
| 3,484,437 | 12/1969 | Urech et al. | 260/243 C |
| 3,575,969 | 4/1971 | Morin et al. | 260/243 C |
| 3,579,506 | 5/1971 | Lemieux et al. | 260/243 C |
| 3,632,578 | 1/1972 | Chauvette | 260/243 C |
| 3,708,477 | 1/1973 | Martel et al. | 260/243 C |
| 3,749,711 | 7/1973 | Schorr et al. | 260/239.1 |

*Primary Examiner*—Nicholas S. Rizzo
*Attorney, Agent, or Firm*—Curtis, Morris & Safford

[57] ABSTRACT

Acylaminocephalosporanic acids of the formula I

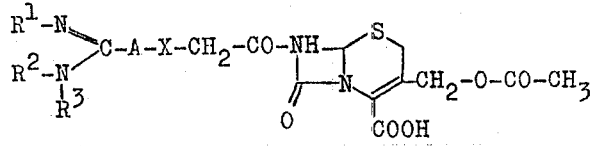

wherein $R^1$, $R^2$ and $R^3$ each represents hydrogen or lower alkyl radicals in which case $R^1$ and $R^2$ may also form together an optionally substituted alkylene radical, A represents an optionally substituted phenylene or thienyl radical, and X represents an oxygen atom or a single bond, the physiologically tolerable salts thereof, pharmaceutical preparations effective against bacterial infections containing these compounds, and a process for the manufacture.

8 Claims, No Drawings

ACYLAMINO-CEPHALOSPORANIC ACIDS

The present invention relates to acylamino-cephalosporanic acids and a process for preparing them.

This invention provides acylamino-cephalosporanic acids of the formula I

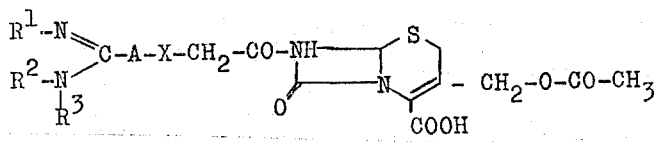

wherein R¹, R² and R³ each represents a hydrogen atom or lower alkyl radicals, and R¹ and R² together may form an alkylene radical optionally carrying substituents, A represents a phenylene or thienylene radicals optionally carrying substituents and X represents an oxygen atom or a single bond.

This invention also provides a process for the manufacture of said acylamino-cephalosporanic acids of the formula I and the salts thereof which process comprises reacting 7-amino-cephalo-sporanic acid (7-ACS) or a salt thereof with a carboxylic acid of the formula II

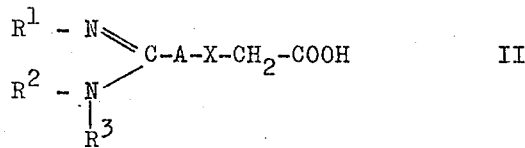

wherein R¹, R², R³, A and X are defined as above, especially in the form of a derivative capable of reacting with an amino group, or of a salt of such a compound.

If R¹, R² and R³ each represents an alkayl radical, straight-chain or branched alkyl radicals carrying from 1 to 5 carbon atoms can be used, the total number of carbon atoms in radicals R¹, R² and R³ preferably not exceeding 6.

Suitable alkylene radicals are especially those containing from 2 to 4 carbon atoms. As substituents for the alkylene radical there may be mentioned, for example, low-molecular alkyl radicals having from 1 to 4 carbon atoms which may themselves be closed to a ring optionally interrupted by a hetero atom, preferably an oxygen atom. The alkyl substituents of the alkylene radical which are not closed to a ring, may also contain a hetero atom, preferably an oxygen atom.

A especially stands for the 1,4-phenylene or the 2,5-thienylene radical which radicals may themselves be substituted, for example, by low-molecular alkyl, alcoxy (1 to 4 carbon atoms) or halogen, preferably by chlorine.

For the process of the invention, the following compounds of formula II are suitable as starting materials:
4-amidino-phenylacetic acid
4-N-methyl-amidino-phenylacetic acid
4-N,N-dimethyl-amidino-phenylacetic acid
4-N,N'-dimethyl-amidino-phenylacetic acid
4-N,N,N'-trimethyl-amidino-phenylacetic acid
4-N-ethyl-amidino-phenylacetic acid
4-N,N'-dipropyl-amidino-phenylacetic acid
4-N-i-pentyl-amidino-phenylacetic acid
4-N,N-dimethyl-N'-ethylamidino-phenylacetic acid
4-(2-imidazolinyl)-phenylacetic acid
4-(1,4,5,6-tetrahydro-2-pyrimidyl)-phenylacetic acid
4-(1-methyl-1,4,5,6-tetrahydro-2-pyrimidyl)-phenylacetic acid
4-[5,5-bis(2-methoxyethyl)-1,4,5,6-tetrahydro-2-pyrimidyl]-phenylacetic acid
4-(1,5-dimethyl)-2-imidazolinyl)-phenylacetic acid
4-(1-methyl-5-butyl-2-imidazolinyl)-phenylacetic acid
4-(5,5-dimethyl-1,4,5,6-tetrahydro-2-pyrimidyl)-phenylacetic acid
4-(1,4,6,7,8,9-hexahydro-5H-cyclopentyl[d]pyrimidyl-2)-phenyl-acetic acid
4-(9-oxa-2,4-diazaspiro[5,5]undec-2-en-3-yl)-phenylacetic acid
4-(2,4-diazaspiro[5,5]undec-2-en-3-yl)-phenylacetic acid
4-(2,4-diazaspiro[5,4]-dec-2-en-3-yl)-phenylacetic acid
4-N,N'-tetramethylene-amidino-phenylacetic acid
3-amidino-phenylacetic acid
4-amidino-2-methyl-phenylacetic acid or
4-amidino-2-methoxy-phenylacetic acid
4-amidino-2-butoxy-phenylacetic acid
4-amidino-2-chloro-phenylacetic acid or the corresponding phenoxy-, thienyl- or thienyloxyacetic acids.

The carboxylic acids of the general formula II are prepared in the known manner starting from 4-cyanophenyl-, 4-cyano-phenoxy- or 5 cyanothienyl- or 5-cyanothienyloxy-acetic acid esters. After conversion of the cyano group into an imino ether the compounds are reacted with ammonia or an amine or diamine to yield amidine and the carboxylic acid ester group or an acid amide group derived therefrom is saponified.

The novel acyl derivatives of the 7-aminocephalosporanic acid are advantageously obtained by reacting a salt of the 7-aminocephalosporanic acid, for example, an alkali metal or tertiary amine salt, such as the sodium, potassium or triethylamine salt, with a reactive derivative of a carboxylic acid of the general formula II, if possible, at a neutral pH, preferably at a pH of from 6 to 9.

The salts of the 7-aminocephalosporanic acid may be used directly or may be prepared in the solution used for the reaction of 7-aminocephalosporanic acid and, for example, sodium hydrogencarbonate, disodium hydrogenphosphate or triethylamine.

In general, the reaction in accordance with the invention is carried out in water. It may also be worked in the presence of solvents miscible with water, for example, acetone, dimethylformamide, dimethylacetamide, dioxan or tetrahydrofuran.

The acylation of the 7-aminocephalosporanic acid in accordance with the invention is suitably carried out with the acid chlorides of the carboxylic acids of the general formula II. They may be obtained in known manner from the carboxylic acids by the action of thionyl chloride in an inert solvent, for example, an aromatic hydrocarbon. They are obtained as hydrochlorides which can be used directly for the further reaction. Besides the acid chlorides, there may also be used other reactive derivatives of the carboxylic acids of formula II, such as, for example, acid bromides, activated esters, for example p-nitrophenyl ester, p-nitrophenylthioester or cyanmethyl ester, acid azides or symmetrical or mixed anhydrides.

The acylation of the 7-aminocephalosporanic acid is advantageously effected in such a manner that equimolar amounts or a small excess of a compound of formula II are added in the form of its reactive derivative to the solution of a salt of the 7-aminocephalosporanic acid in water or in a mixture of water and solvents miscible in water.

It has proved to be especially advantageous to introduce the hydrochloride of the acid chloride in solid form. To bound the hydrochloric acid two equivalents of a base, for example sodium hydrogencarbonate or triethylamine are previously added to the solution. The reaction is effected at room temperature or at slightly elevated temperature, preferably within the range of from $-5°$ to $+5°$. The pH-value which is first slightly alkaline is reduced to about 7 in the course of the reaction. It is then adjusted to about 5 with an acid, preferably with a dilute hydrochloric acid so that the acylamino-cephalosporanic acid containing an amidino group is present in the form of an inner salt. In some cases it precipitates in this form from the reaction solution directly as crystals and can be suction-filtered. if no crystallization occurs, the solution can also be evaporated to dryness to isolate the novel cephalosporin, which is advantageously carried out by using the method of lyophilizing.

Thus, a product is obtained which contains besides the cephalosporin also the salts obtained during the reaction. When the starting products had advantageously been used in molar radio the impurities mainly formed in the course of the reaction are the alkali metal or amine salts. When using sodium hydrogencarbonate for the preparation of the 7amino-cephalosporanic acid and an acid chloride, the crude cephalosporin contains, for example, only sodium chloride as essential ingredient. Due to the smooth course of the reaction, the cephalosporin/salt mixtures are already so pure that they can be used directly for therapeutical purposes. They may, however, be further worked to yield the pure cephalosporins.

So, for example, the cephalosporin/salt mixture obtained can be dissolved in water in a highly concentrated form. The cephalosporin is separated from this solution generally in crystalline form. By suction-filtration and washing with ice water, it may be obtained in a form practically free from salts.

The novel acylaminocephalosporanic acids of the Formula I contain in the molecule an optionally substituted amidino group and have therefore amphoteric character. They form inner salts and are easily soluble in water with a pH of about 5. In the IR-spectrum, these compounds show the absorption band at 1,770 cm$^{-1}$ characteristics of the $\beta$-lactam ring. The products may also be characterized by thin-layer chromatography. The content can be determined in the usual manner by means of iodometry.

The products in accordance with the invention can be used in substance, in the form of their physiologically tolerable salts or optionally in the form of the crude products described above. As physiologically tolerable salt forming agents of this kind there may be mentioned, for example, hydrochloric acid, hydrobromic acid, amidosulfonic acid, citric acid, acetic acid and suitable bases, such as sodium hydroxide, ammonia or ethanol amine. The salts are obtained, for example, by mixing equivalent amounts in solution and vaporization.

The novel acylaminocephalosporanic acids have excellent antibacterial properties. The spectrum of activity is extended to Gram-positive and Gram-negative bacteria. In comparison with other cephalosporins used in therapy distinct differences can be observed with regard to the sensitivity of the individual germ. In some cases the known cephalosporins are largely surpassed by the novel products containing an optionally substituted amidino group so that they have decisive therapeutical advantages in the treatment of infections resulting from those bacteria. Table I shows a comparison of several of the novel cephalosporins with a known one. The values indicated are to be understood as minimum inhibition concentrations evaluated with streptococci (seriological group A) in the series dilution test using $10^5$ germs per tube.

Table II indicates the results of comparative chemotherapeutical tests with the mouse infected with streptococci. The substances were administered subcutaneously or per os to the animals three times within 24 hours. Groups of four mice per dosage unit were used. The numbers in Table II refer to the surviving animals each at the second and tenth day post infectionem.

Table 1

Minimum inhibition concentration in α/ml
Germ: Streptococcous seriological group A.

| Substance | MTC |
|---|---|
| a | 0.0078 |
| b | 0.0156 |
| c | 0.0078 |
| d | 0.0125 |
| e | 0.0156 |
| cephalothin | 0.05 | a = 7-(4-amidinophenoxyacetylamino)-cephalosporanic acid b = 7-[4-(1-methyl-1,4,5,6-tetrahydro-2-pyrimidyl)-phenylacetylamino[-cephalosporanic acid c = 7-(4-amidinophenylacetylamino)-cephalosporanic acid d = 7-[4-(5,5-dimethyl-1,4,5,6-tetrahydro-2-pyrimidyl)-phenoxyacetylamino]-cephalosporanic acid e = 7-(5-amidino-2-thienylacetylamino)-cephalosporanic acid Table 2

| Substance | Subcutaneous treatment | | | Per os | | |
|---|---|---|---|---|---|---|
| | Dosage unit α/kg | Surviving animals on the 2nd day | 10th day | Dosage unit α/kg | Surviving animals on the 2nd day | 10th day |
| Chemotherapeutical test — Test animal: mouse — Infection: Streptococcous seriological group A. | | | | | | |
| a | 3 × 62.5 | 4 | 4 | 3 × 2.5 | 4 | 4 |
| | | | | 3 × 1.25 | 4 | 1 |
| b | 3 × 500 | 4 | 4 | 3 × 25 | 4 | 4 |
| | 3 × 250 | 2 | 2 | 3 × 5 | 4 | 3 |
| c | 3 × 100 | 4 | 4 | 3 × 1.5 | 4 | 4 |
| | 3 × 50 | 3 | 3 | 3 × 0.75 | 2 | 2 |
| cephalothin | 3 × 1500 | 4 | 4 | 3 × 50 | 4 | 4 |
| | 3 × 750 | 1 | 1 | 3 × 25 | 3 | 3 |

The tables demonstrate the valuable properties and the superior effect of the novel cephalosporins used against special infections.

The products in accordance with the invention are valuable therapeutics which are very suitable for the treatment of bacterial infections. They can be applied as such or in the form of galenic preparations in combination with therapeutically suitable carriers and excepients, for example tragacanth, lactose, talc, agar-agar, for example, in the form of tablets, dragees, capsules or of solutions or suspensions which contain the active substance in an amount of about 50 to 1,000 mg, preferably of from 100 – 500 mg. For parenteral administration suspensions or solutions in water are preferably used. Other physiologically tolerable organic solvents may also be added, such as, for example, ethanol, polyglycols, and solubilizers. A combination with other active substances can also be used.

The following Examples illustrate the invention:

EXAMPLES

The novel cephalosporins described in the following Examples were characterized by the $R_f$-value of the thin layer chromatogram, in which silica gel (Merck) was used as layer and a 0.1 N aqueous ammonium acetate solution as eluent. The development of the plates was effected by the action of iodine vapour. The $R_f$ value of the 7-aminocephalosporanic acid was 0.75 under these conditions.

EXAMPLE 1

7-(4-Amidinophenylacetylamino)-cephalosporanic acid a. 5.35 g of 4-amidinophenyl acetic acid (melting point 295°–297°C under decomposition) were suspended in 45 cc. of dry benzene. Two drops of dimethyl formamide and 17.9 g of thionyl chloride were added and the solution was heated under reflux for 1½ hours. After cooling, the solid product was suction-filtered, washed with dry benzene and dried in vacuo. 6.9 g of 4-amidinophenyl acetic acid chloride-hydrochloride were obtained; melting point: 174°–177°C under decomposition.

b. 588 mg of sodium bicarbonate and 544 mg of 7-aminocephalosporanic acid were dissolved in a mixture of 20 cc. of water and 2 cc. of acetone. At about 0°C within 10 minutes, 513 mg of 4-amidinophenyl- acetic acid chloride-hydrochloride were introduced, stirred at 0°C for 45 minutes and filtered. The clear filtrate was adjusted at pH 5.0 with 2 N hydrochloric acid whereupon crystallization occurred. The mixture was allowed to stand for a determined period of time, it was then suction-filtered and washed with a small amount of ice water, acetone and ether. 350 mg of 7-(4-amidinophenylacetylamino)-cephalosporanic acid were obtained; melting point: decomposition begins with 230°C; $R_f$-value: 0.47.

In an analogous manner, there was obtained:
7-(5-amidino-2-thienylacetylamino)-cephalosporanic acid;
Melting point: decomposition begins at 230°C; $R_f$-value: 0.40.

EXAMPLE 2

7-(4-Amidinophenoxyacetylamino)-cephalosporanic acid 294 mg of sodium bicarbonate and 272.2 mg of 7-aminocephalosporanic acid were dissolved at 0°C in a mixture of 10 cc. of water and 1 cc. of acetone. Within a period of time of about 10 minutes 298 mg of 4-amidinophenoxyacetic acid chloridehydrochloride were introduced, the mixture was stirred at 0°C for 45 minutes and was filtered. The clear filtrate was adjusted at pH 5.0 with 0.1 N hydrochloric acid and the solvent was eliminated by freeze-drying. The loose lyophilisate (420 mg) contained in addition to the novel cephalosporin the sodium chloride formed during the reaction. The content of 7-(4-amidinophenoxyacetylamino)-cephalosporanic acid evaluated by iodometry was 68 percent which corresponded to the theoretical $R_f$-value of 0.49.

In an analogous manner there was obtained:
7-[4-(5,5-dimethyl-1,4,5,6-tetrahydro-2-pyrimidyl)-phenoxy-acetylamino]-cephalosporanic acid; $R_f$ value = 0.22.
7-[4-(9-oxa-2,4-diazaspiro[5,5] undec-2-en-3-yl)-phenoxy-acetylamino]-cephalosporanic acid; $R_f$ value = 0.18.
7-[4-(1-methyl-1,4,5,6-tetrahydro-2-pyrimidyl)-phenylacetylamino] -cephalosporanic acid; $R_f$ value = 0.18.
7-[4-(2-imidazolinyl)-phenoxyacetylamino]-cephalosporanic acid; $R_f$-value = 0.41.

What is claimed is:

1. An acylaminocephalosporanic acid of the formula

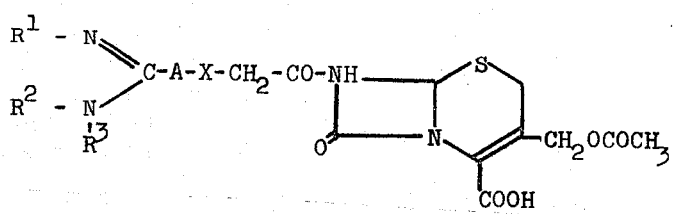

and the physiologically tolerable salts thereof, wherein $R^1$ and $R^2$, taken alone, are hydrogen or alkyl having 1 to 5 carbon atoms or, taken together, are alkylene having 2 to 4 carbon atoms which may be substituted by alkyl having 1 to 4 carbon atoms which may contain an oxygen atom or by alkyl substituents having 1 to 4 carbon atoms closed to a ring which may be interrupted by an oxygen atom; $R^3$ is hydrogen or alkyl having 1 to 5 carbon atoms; A is phenylene or thienyl which may be substituted by alkyl having 1 to 4 carbon atoms, alkoxy of 1 to 4 carbon atoms, or halogen; and X is an oxygen atom or a single bond.

2. A compound as claimed in claim 1, wherein $R_1$, $R_2$ and $R_3$ each stand for hydrogen, A represents p-phenylene and X is a single bond.

3. A compound as claimed in claim 1, wherein $R_1$, $R_2$ and $R_3$ each stand for hydrogen, A represents p-phenylene and X is oxygen.

4. A compound as claimed in claim 1, wherein $R_1$, $R_2$ and $R_3$ each stand for hydrogen, A represents 2-thienyl, and amidino radical being linked in the 5-position of the thienyl radical, and X is a single bond.

5. A compound as claimed in claim 1, wherein $R_1$ and $R_2$ together stand for n-propylene, $R_3$ is methyl, A represents p-phenylene and X is a single bond.

6. A compound as claimed in claim 1, wherein $R_1$ and $R_2$ together stand for

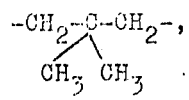

$R_3$ is H, A represents p-phenylene and X is oxygen.

7. A compound as claimed in claim 1, wherein $R_1$ and $R_2$ together stand for

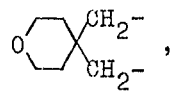

$R_3$ is hydrogen, A represents p-phenylene and X is oxygen.

8. A compound as claimed in claim 1, wherein $R_1$ and $R_2$ together stand for ethylene, $R_3$ is hydrogen, A represents p-phenylene and X is oxygen.

* * * * *